(12) United States Patent
Marinescu et al.

(10) Patent No.: US 8,561,190 B2
(45) Date of Patent: Oct. 15, 2013

(54) SYSTEM AND METHOD OF OPPORTUNISTICALLY PROTECTING A COMPUTER FROM MALWARE

(75) Inventors: Adrian M Marinescu, Sammamish, WA (US); Marc E Seinfeld, Mid Levels (HK); Matthew I Braverman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1589 days.

(21) Appl. No.: 11/130,570

(22) Filed: May 16, 2005

(65) Prior Publication Data
US 2006/0259974 A1 Nov. 16, 2006

(51) Int. Cl.
*H04L 29/06* (2006.01)

(52) U.S. Cl.
USPC ............... 726/24; 726/22; 726/23; 726/25; 713/188

(58) Field of Classification Search
USPC ............. 726/22–25; 713/188; 708/238–249
See application file for complete search history.

(56) References Cited

U.S. PATENT DOCUMENTS

| | | | |
|---|---|---|---|
| 6,374,287 B1* | 4/2002 | Goldstein | 709/201 |
| 7,133,897 B1* | 11/2006 | Tran | 709/206 |
| 7,260,844 B1* | 8/2007 | Tidwell et al. | 726/22 |
| 7,437,764 B1* | 10/2008 | Sobel et al. | 726/25 |
| 7,568,233 B1* | 7/2009 | Szor et al. | 726/25 |
| 7,694,150 B1* | 4/2010 | Kirby | 713/188 |
| 7,761,917 B1* | 7/2010 | Kumar | 726/23 |
| 2003/0126472 A1* | 7/2003 | Banzhof | 713/201 |
| 2003/0204632 A1* | 10/2003 | Willebeek-LeMair et al. | 709/249 |
| 2004/0128530 A1* | 7/2004 | Isenberg | 713/200 |
| 2005/0131811 A1* | 6/2005 | Ranzini et al. | 705/39 |
| 2005/0132206 A1* | 6/2005 | Palliyil et al. | 713/188 |
| 2006/0031938 A1* | 2/2006 | Choi | 726/25 |
| 2006/0070130 A1* | 3/2006 | Costea et al. | 726/24 |

OTHER PUBLICATIONS

Arora et al., "Impact of Vulnerability Disclosure and Patch Availability—An Empirical Analysis", Apr. 2004, pp. 1-20.*

* cited by examiner

*Primary Examiner* — Taghi Arani
*Assistant Examiner* — Thaddeus Plecha
(74) *Attorney, Agent, or Firm* — L. Alan Collins; Collins & Collins Intellectual, LLC (57) ABSTRACT

The present invention provides a system, method, and computer-readable medium that opportunistically install a software update on a computer that closes a vulnerability that existed on the computer. In accordance with one aspect of the present invention, when antivirus software on a computer identifies malware, a method causes a software update that closes the vulnerability exploited by the malware to be installed on the computer. The method includes identifying the vulnerability exploited by the malware, using a software update system to obtain a software update that is configured to close the vulnerability; and causing the software update to be installed on the computer where the vulnerability exists.

13 Claims, 6 Drawing Sheets

SYSTEM AND METHOD OF OPPORTUNISTICALLY PROTECTING A COMPUTER FROM MALWARE

FIELD OF THE INVENTION

The present invention relates to computers and, more particularly, to opportunistically protecting a computer from malware.

BACKGROUND OF THE INVENTION

As more and more computers and other computing devices are interconnected through various networks such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware or, more simply, malware.

When a computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer is used to infect other systems.

Figure 1:
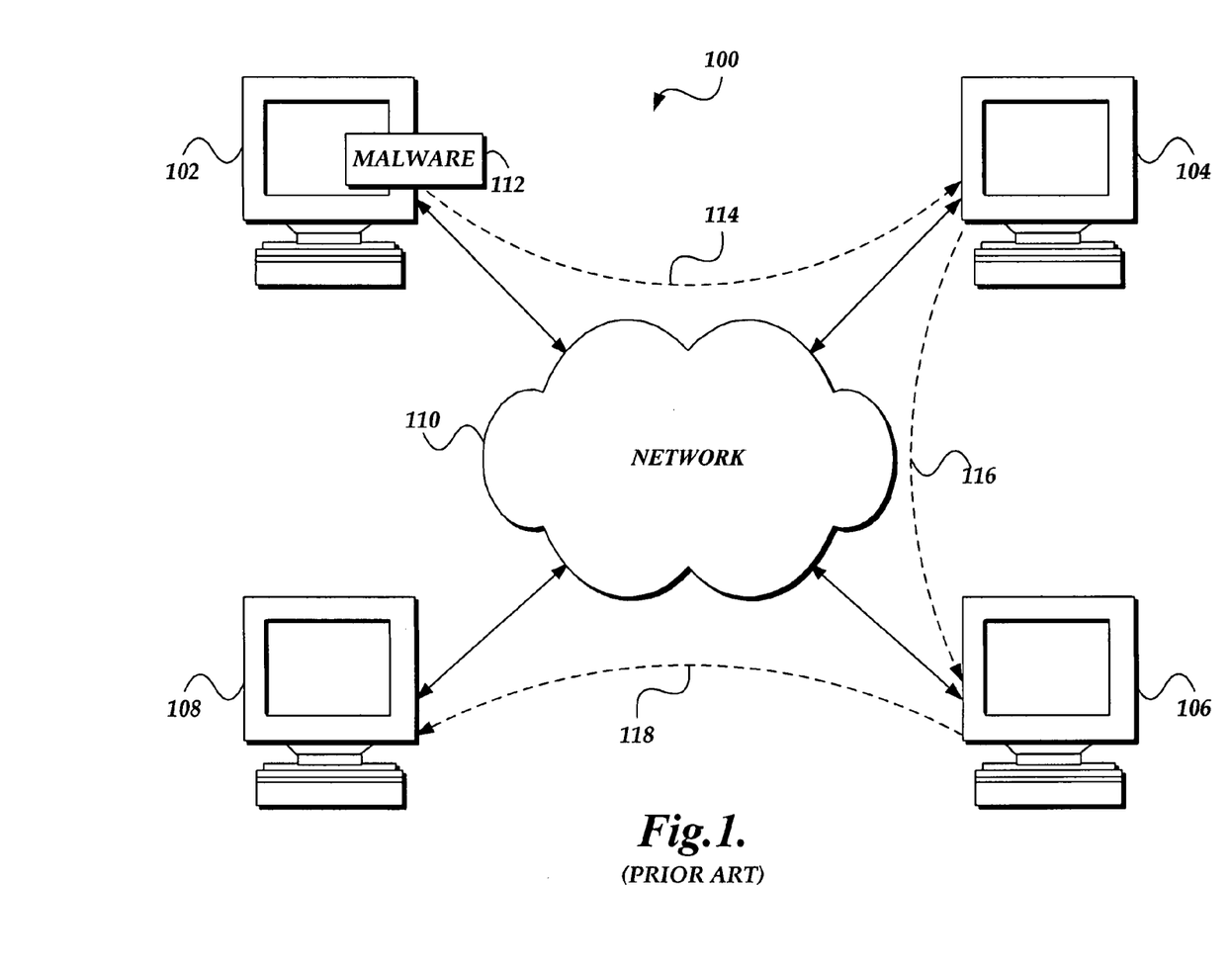
FIG. 1 is a pictorial diagram illustrating a conventional networking environment over which malware is commonly distributed.

FIG. 1 is a pictorial diagram illustrating an exemplary networking environment 100 over which a computer malware is commonly distributed. As shown in FIG. 1, the typical exemplary networking environment 100 includes a plurality of computers 102-108 all inter-connected via a communication network 110 such as an intranet or via a larger communication network including the global TCP/IP network commonly referred to as the Internet. For whatever reason, a malicious party on a computer connected to the network 110, such as computer 102, develops a computer malware 112 and releases it on the network. The released computer malware 112 is received by and infects one or more computers, such as computer 104, as indicated by arrow 114. As is typical with many computer malware, once infected, computer 104 is used to infect other computers, such as computer 106 as indicated by arrow 116 that, in turn, infects yet other computers, such as computer 108 as indicated by arrow 118. It should be appreciated that the malware 112 may be directed to any one of the computers 104-108 as a result of a request initiated by the computer 102. Clearly, due to the speed and reach of the modern computer networks, a computer malware 112 can "grow" at an exponential rate and quickly disrupt communications between organizations and people.

When a new malware is identified as spreading on a communication network such as the Internet, different software providers initiate a process for handling the malware. More specifically, typically at least two software providers create software updates when new malware is identified. One software provider is an antivirus software provider that creates a software update designed to identify the new malware and remove the malware from a computer. Those skilled in the art and others will recognize that a traditional defense against computer malware, and particularly computer viruses and worms, is antivirus software which typically scans data that is transmitted to a computer, searching for identifiable patterns, referred to as signatures, which are associated with known malware. If a malware signature is identified, the antivirus software takes appropriate action, such as deleting the malware/infected file or removing the malware from an infected file. However, existing antivirus software does not provide software updates that are designed to close the vulnerability exploited by the malware to infect one or more computers. As a result, a computer may become reinfected with the malware, in some instances, even though antivirus software on a computer is "up-to-date" with the most recent software updates.

Another software provider that typically creates software updates when a new malware is identified is an operating system provider. While most malware released today are based on known vulnerabilities, occasionally a computer malware is released that takes advantage of a previously unknown vulnerability. In this instance, the operating system provider creates a software update, commonly known as a "patch," that is designed to close the vulnerability exploited by the new malware. By installing a patch designed to close the vulnerability, the computer is protected against being infected with the malware.

Providing adequate protection against malware includes installing updates to antivirus software and operating system patches designed to prevent the malware from infecting a computer. However, users often leave computers exposed to malware even in instances when software updates would protect the computers. For example, some users mistakenly believe that antivirus software will protect a computer from being infected with malware in all instances. However, frequently computers with "up-to-date" antivirus software are infected with malware if a patch designed to close the vulnerability exploited by the malware is not installed.

SUMMARY OF THE INVENTION

The foregoing problems with the state of the prior art are overcome by the principles of the present invention, which are directed toward a system, method, and computer-readable medium for opportunistically installing a software update on a computer that closes a vulnerability that exists on the computer.

In accordance with one aspect of the present invention, when antivirus software on a computer identifies malware, a method causes a software update that closes the vulnerability exploited by the malware to be installed on the computer. More specifically, the method comprises: identifying the vulnerability exploited by the malware; using a software update system to obtain a software update that is designed to close the vulnerability; and causing the software update to be installed on the computer.

In accordance with another aspect of the present invention, a method of identifying a vulnerability exploited by a malware is provided. In one embodiment, the vulnerability exploited by the malware is identified entirely on a computer associated with a user. In this instance, a lookup of a database that maps a vulnerability to one or more malware is performed in order to identify the vulnerability. In other embodiments, a remote computer associated with a trusted entity is used to identify the vulnerability. For example, in one embodiment, when a malware is identified the vulnerability is identified by generating a crash dump that contains the current memory contents of the computer; transmitting the crash dump to a remote computer associated with a trusted entity; and causing the remote computer to match the memory contents of the computer with a malware and associated vulnerability. In yet another embodiment that uses a remote computer to identify the vulnerability exploited by the malware, a trusted entity provides a Web service that is available to a local computer associated with a user. In this instance, the method for identifying the vulnerability includes causing the local computer associated with the user to issue a call to the Web service and causing the remote computer to match data provided in the call to a vulnerability using a data store that maps a vulnerability to one or more malware.

In still another aspect of the present invention, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become in more readily appreciated as the same become better understood by reference to the following detailed description, when taken in conjunction with the accompanying drawings, wherein.

DETAILED DESCRIPTION

The present invention provides a system, method, and computer-readable medium that opportunistically installs a software update configured to close a known vulnerability that exists on a computer. Those skilled in the art and others will recognize that, to protect a computer from malware, at least two defensive mechanisms are necessary. The first defensive mechanism is "up-to-date" antivirus software that is designed to identify and remove malware from a computer. The second defensive mechanism involves regularly installing software updates or "patches" that close vulnerabilities on the computer. In general terms describing one aspect of the present invention, antivirus software is used to determine when a computer is vulnerable to malware. For example, when a malware infection is identified, the present invention matches the malware identified to the vulnerability exploited by the malware. Once the vulnerability exploited by the malware is known, a software update system is used to obtain the software update that is configured to close the vulnerability exploited by the malware. Finally, the software update is installed on the computer where the malware infection was identified, thereby protecting the computer from malware that exploits this vulnerability.

The following description first provides an overview of aspects of the present invention. Then a method for implementing the present invention is described. The illustrative examples provided herein are not intended to be exhaustive or to limit the invention to the precise forms disclosed. Similarly, any steps described herein may be interchangeable with other steps or combinations of steps in order to achieve the same result.

Figure 2:
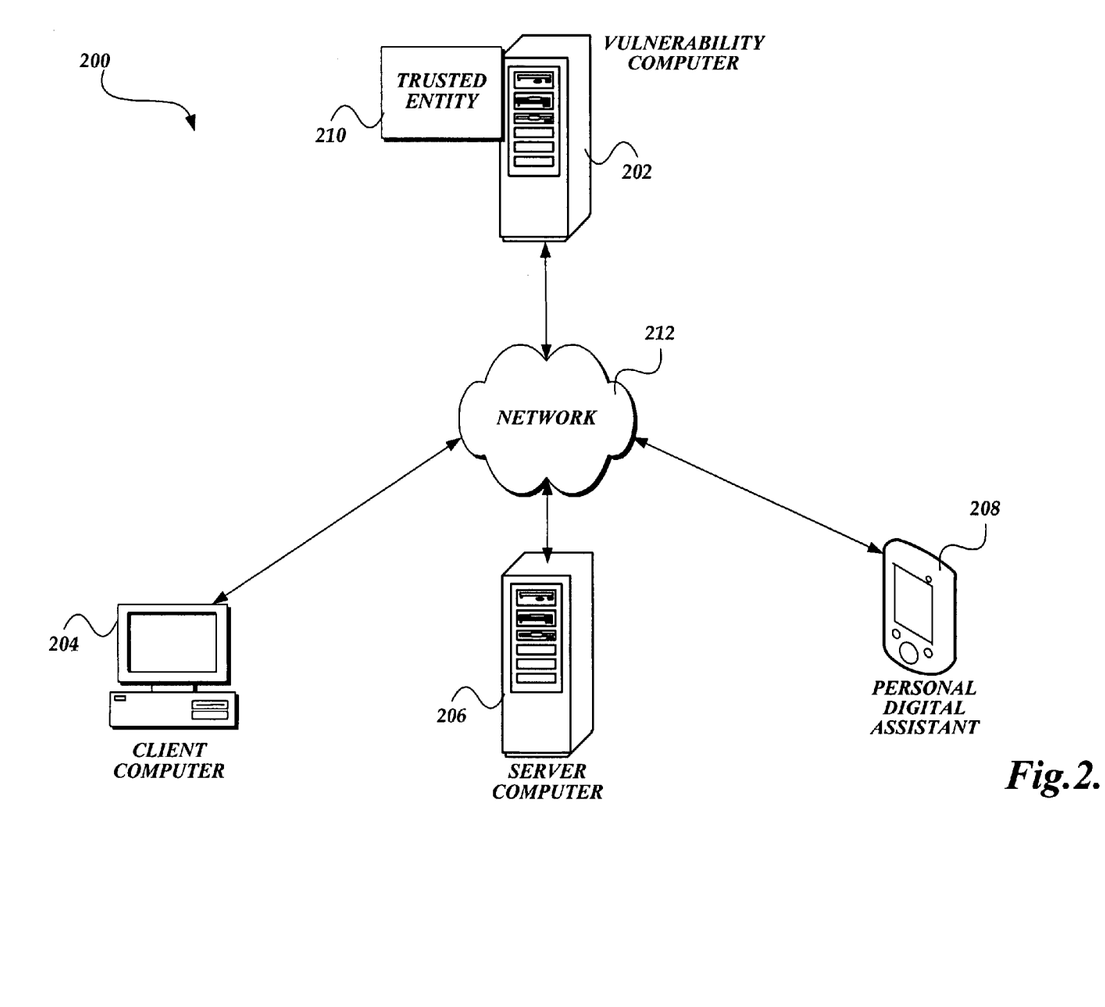
FIG. 2 is a pictorial diagram illustrating a conventional networking environment with computers that are capable of implementing aspects of the present invention.

The following discussion is intended to provide a brief, general description of a networking environment 200 suitable to implement aspects of the present invention. As illustrated in FIG. 2, the networking environment 200 comprises a plurality of computers—namely, the vulnerability computer 202, the client computer 204, the server computer 206, and the Personal Digital Assistant ("PDA") 208. The vulnerability computer 202 is shown associated with a trusted entity 210. Also, the vulnerability computer 202 is configured to communicate with the client computer 204, server computer 206, and the PDA 208, via the network 212, which may be implemented as a local area network ("LAN"), wide area network ("WAN"), or the global network commonly known as the Internet. As known to those skilled in the art and others, the computers 202, 204, 206, and 208 illustrated in FIG. 2 may be configured to exchange files, commands, and other types of data.

For the sake of convenience, FIG. 2 illustrates personal computers and a Personal Digital Assistant usable in the networking environment 200 in which complementary tasks may be performed by remote computers linked together through a communication network 212. However, those skilled in the art will appreciate that the invention may be practiced with many other computer system configurations. For example, the invention may be practiced with a personal computer operating in a stand-alone environment or with multiprocessor systems, minicomputers, mainframe computers, and the like. In this regard, the functions performed by the computers, described herein, may be implemented by a plurality of computers. In addition to the conventional computer systems illustrated in FIG. 1, those skilled in the art will also recognize that the invention may be practiced on other kinds of computers, including laptop computers, tablet computers, or any device upon which computer software or other digital content may be installed.

When software formed in accordance with the present invention is implemented in one or more computers, the software provides a way to opportunistically close a vulnerability on a computer. More specifically, in one embodiment of the present invention, any of the computers 204, 206, and 208 that are communicatively connected to the network 212 may obtain a software update that was created by the trusted entity 210 and made available from the vulnerability computer 202. Typically, the software update is obtained when antivirus software on the computers 204, 206, and 208 identifies a malware infection. Then software formed in accordance with the present invention identifies the vulnerability exploited by the malware. When the vulnerability exploited by the malware is known, a software update is obtained from the vulnerability computer 202 and installed on the computer where the malware was identified. The present invention takes advantage of the fact that when malware is identified on a computer, the identification means that the computer was not updated with a "patch" designed to close the vulnerability exploited by the malware. As a result, the present invention automatically and conveniently protects the computer where the malware was identified from future infections without requiring significant effort on the part of the user.

Figure 3:
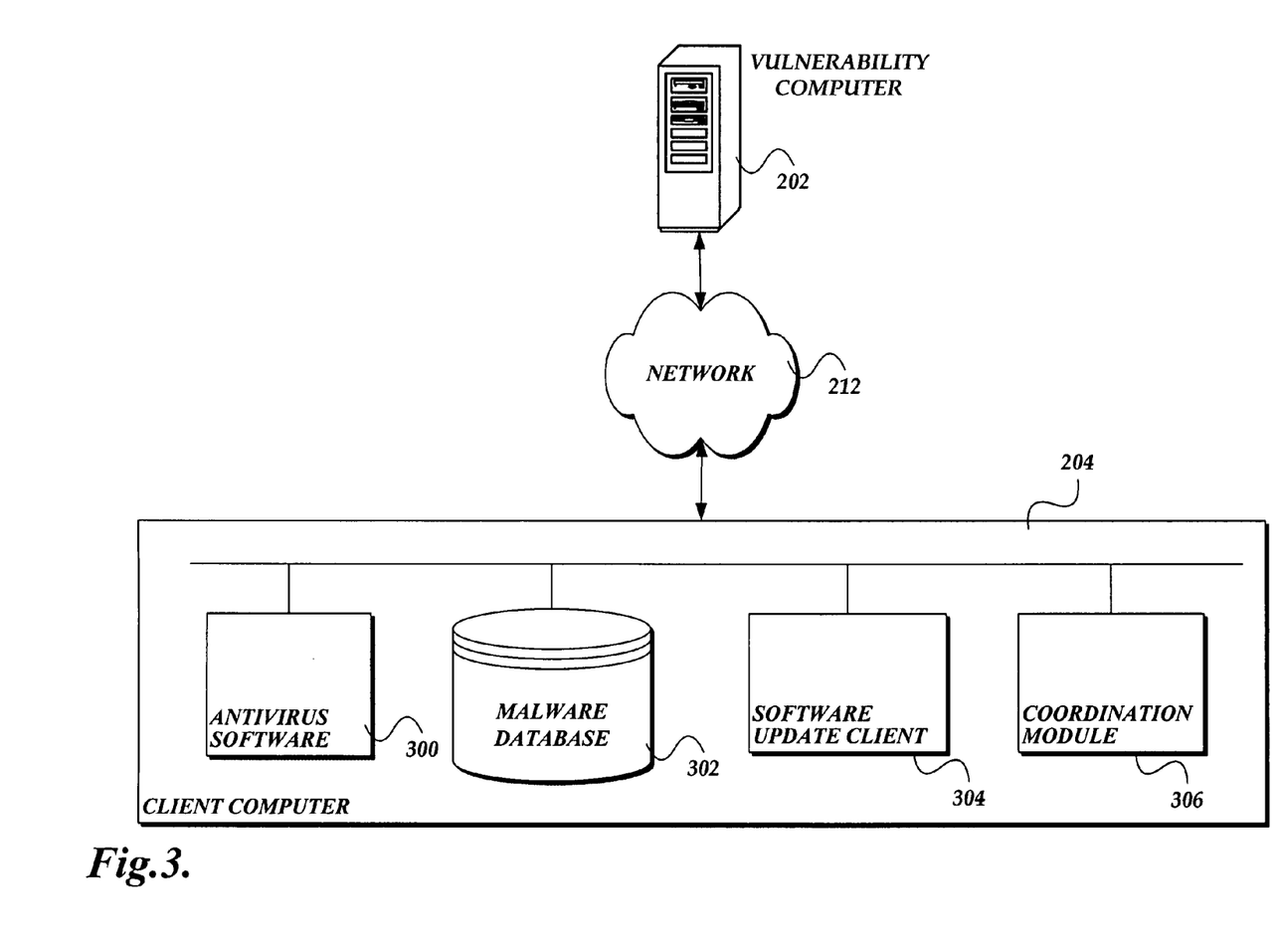
FIG. 3 is a block diagram that illustrates software components that are capable of closing a vulnerability on the client computer illustrated in FIG. 2, in accordance with the present invention.

Referring now to FIG. 3, the following is intended to provide an exemplary overview of the components that implement aspects of the present invention. As mentioned previously, the client computer 204 may be any one of a variety of devices including, but not limited to, personal computing devices, server-based computing devices, and the like. For ease of illustration and because they are not important for an understanding of the present invention, FIG. 3 does not show the typical components of many computers, such as a CPU, keyboard, mouse, printer, or other I/O devices, display, etc. However, as illustrated in FIG. 3, the client computer 204 contains antivirus software 300, a malware database 302, a software update client 304, and a coordination module 306 which collectively provide a way to opportunistically close a vulnerability on the client computer 204, thereby protecting the computer 204 from malware.

As illustrated in FIG. 3, the client computer 204 includes an antivirus software 300 designed to identify data characteristic of malware. Many different software vendors provide antivirus software to identify and remove malware from a computer. One known technique employed by some existing antivirus software that is used to identify data characteristic of malware includes obtaining a copy of the malware "in the wild." The program code that implements the malware is processed with a hash function that converts the program code or a characteristic subset of the program code into a signature that uniquely identifies the malware. The antivirus software 300 illustrated in FIG. 3 may employ this known technique of scanning data for a malware signature. Also, increasingly, heuristic techniques employed for identifying malware may be used by the antivirus software 300. However, it should be well understood that the examples described herein should be construed as exemplary and not limiting, as the antivirus software 300 may employ any of a number of malware detection techniques.

As further illustrated in FIG. 3, the client computer 204 includes a coordination module 306 and a malware database 302. Since functions and different embodiments of the coordination module 306 are described below with reference to FIG. 6, a detailed description of the module 306 will not be provided here. However, generally described, the coordination module 306 receives notice from the antivirus software 300 when malware is identified on a computer 204. Then, in one embodiment of the present invention, the coordination module 306 performs a lookup in the malware database 302. As described in further detail below, the malware database 302 maps a vulnerability to one or more malware that exploit the vulnerability to gain access to the computer 204. By performing a lookup in the malware database 302, the coordination module 306 is able to identify the vulnerability exploited by the malware. Then, in accordance with one embodiment of the present invention, the coordination module 306 uses the software update client 304 to install a software update on the computer 204 that is configured to close the identified vulnerability.

The client computer 204 illustrated in FIG. 3 includes a software update client 304 that is configured to obtain and install a software update on the computer 204. In this regard, the software update client 304 identifies the software state of the computer 204 by performing an analysis of configuration databases stored on the computer 204. As known to those skilled in the art and others, modern computers maintain databases from which configuration information may be obtained. For example, the system registry is a database used to store settings, options, and preferences regarding the operation of a computer, including settings for all the hardware, software, and user preferences. The system registry also stores references to libraries, such as dynamically linked libraries, which identify the code segments and data used by application programs installed on the client computer 204. The software update client 304 analyzes the system registry and other configuration databases to identify the operating system, application programs, and software updates installed on the client computer 204. Then the software update client 304 queries a data store for information about available software updates and rules that govern when a particular software update should be installed. As a result, the software update client 304 produces data that identifies any software updates that need to be installed on the client computer 204, given the configuration of the computer 204 and malware that was identified by the antivirus software 300. Also, the software update client 304 communicates with server-based software on the vulnerability computer 202 in order to obtain any necessary software updates.

Those skilled in the art and others will recognize that FIG. 3 is a simplified example of one client computer 204 that is capable of performing the functions implemented by the present invention. Actual embodiments of the client computer 204 will have additional components not illustrated in FIG. 3 or described in the accompanying text. Also, FIG. 3 shows an exemplary component architecture for opportunistically "patching" a computer—but other component architectures are possible.

Figure 4:
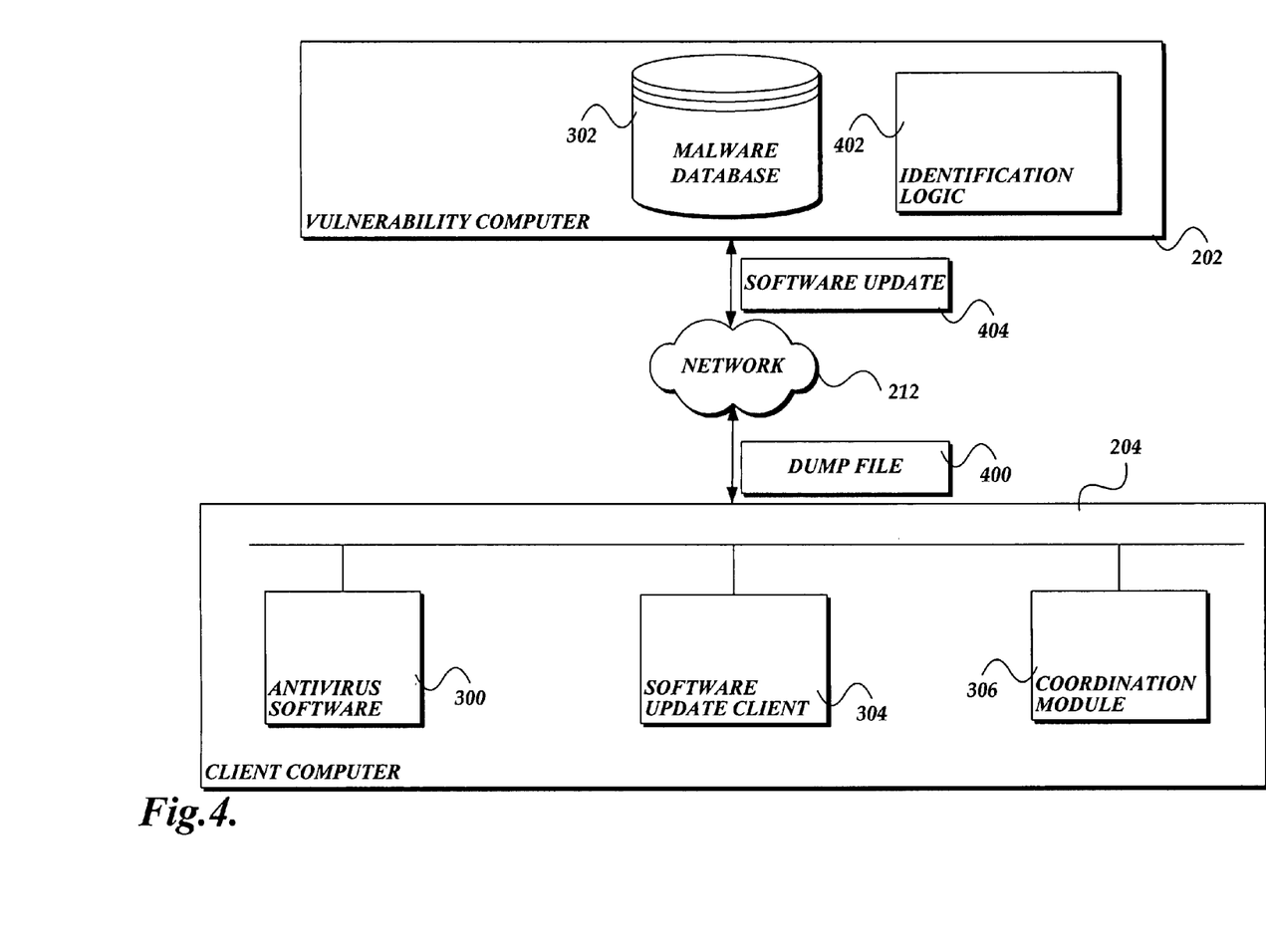
FIG. 4 is a block diagram that illustrates software components that are capable of closing a vulnerability on the client computer illustrated in FIG. 2, in accordance with present invention.

Now with reference to FIG. 4, an alternative embodiment of the present invention in which the vulnerability computer 202 maintains logic for identifying the software update that will be installed on the client computer 204 is described. As illustrated in FIG. 4, in this embodiment, the client computer 204 contains many of the same software components that were described above with reference to FIG. 3. However, when the antivirus software 300 identifies malware on the computer 204, a dump file 400 is generated and transmitted to the vulnerability computer 202. As known to those skilled in the art and others, existing systems are able to generate "dump files" (sometimes referred to as memory dumps or core dumps) when a malware is identified on a computer. Generally described, a dump file is a record of the memory state of a computer that provides developers with access to data and other information that captures the state of different system components. A detailed description of one system suitable to obtain a dump file from a computer may be found in commonly assigned U.S. Pat. No. 6,629,267, titled METHOD AND SYSTEM FOR REPORTING A PROGRAM FAILURE, issued Sep. 30, 2003, the content of which is expressly incorporated herein by reference.

As illustrated in FIG. 4, when the antivirus software 300 identifies a malware infection on the computer 204, the software update client 304 causes the dump file 400 to be transmitted to the vulnerability computer 202. In this embodiment, the vulnerability computer 202 maintains identification logic 402 that takes the dump file 400 as input. In response to receiving the dump file 400, the identification logic 402 performs an analysis, using techniques generally known in the art, to identify the identified malware from data in the dump file 400. Once the malware is identified, the identification logic 402 performs a lookup of the malware database 302 in order to identify the vulnerability exploited by the malware. When the vulnerability is known, the vulnerability computer 202 transmits a software update 404 to the client computer 204 that is designed to close the exploited vulnerability. When the software update 404 is received, the software update client 304 causes the software update 404 to be installed, thereby protecting the computer from malware that exploits this vulnerability.

Now with reference to FIG. 5, another alternative embodiment of the present invention in which the vulnerability computer 202 is used to distribute a software update to the client computer 204 will be described. One system that facilitates the communication of data between computers, using protocols developed for the Internet, is a Web service. Those skilled in the art and others will recognize that a Web service refers to a software system with a network accessible interface that performs actions on behalf of other software systems. A Web service is typically accessed using standard protocols such as the Simple Object Access Protocol ("SOAP"). A software system located on a remote computer may interact with a Web service in a manner prescribed by definitions that are provided in a service description. Also, interactions between software systems typically occur using Extensible Markup Language ("XML")-based messages exchanged via Internet-based protocols, such as the HyperText Transfer Protocol ("HTTP"). In this way, a Web service may expose processes to remote software systems for accessing data or executing operations on a computer or a cluster of computers that provides the Web service. Typically, a Web service supports interactions with other software systems at a specified location on a network that may be identified using a Uniform Resource Indicator ("URI").

Figure 5:
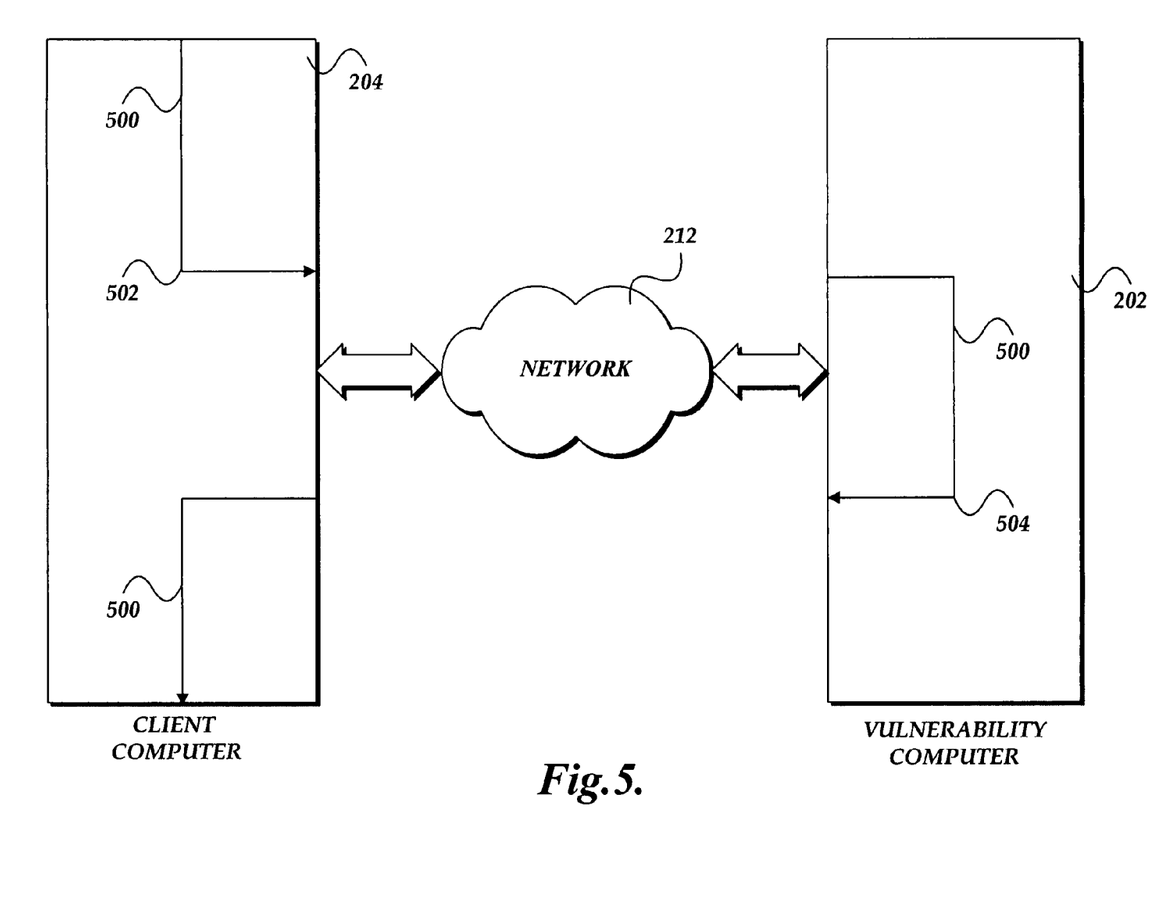
FIG. 5 is a pictorial depiction of a networking environment that includes the vulnerability computer and client computer illustrated in FIG. 2 that are capable of performing functions implemented by the present invention.

FIG. 5 and the following discussion is intended to provide a general description of a Web service that distributes software updates to vulnerable computers in accordance with one embodiment of the present invention. As illustrated in FIG. 5, the client computer 204 and the vulnerability computer 202 are communicatively connected via the network 212. As further illustrated in FIG. 5, the client computer 204 maintains an exemplary flow 500 of program execution. Prior to the infrastructure of modern networks, programs were executed entirely on a single computer. However, those skilled in the art and others will recognize that a Web service provides "black-box functionality" that allows program execution to be distributed over a plurality of computers. For example, an application executing on one computer, such as the client computer 204, may invoke a function on a computer that provides the Web service at event 502, by issuing a request. As a result, the flow 500 of program execution is transferred from the client computer 204 to the vulnerability computer 202. In this instance, invoking the function will typically cause program code to be executed on the vulnerability computer 202. When the function invoked on the Web service completes, at event 504, the flow 500 of program execution is transferred back to the client computer 204. Typically, the Web service will cause data in the form of a response to be transmitted to the client computer 204 using standard network protocols. As illustrated in FIG. 5, a Web service is a type of virtual application that uses the network 212 to link software components.

In one embodiment of the present invention, when malware is identified, the client computer 204 makes a request to a Web service that is maintained by the vulnerability computer 202. The request is designed to provide sufficient information so that the Web service may identify a software update that is configured to close the vulnerability exploited by the malware. For example, the identity of the malware and/or configuration data that describes the software state of the client computer 204 may be transmitted to the Web service. In response to the request, the vulnerability computer 202 may provide a Web page from which the necessary software update can be obtained.

Now with reference to FIG. 6, an exemplary embodiment of the coordination module 306, illustrated in FIGS. 3 and 4, that opportunistically protects a computer from malware will be described.

Figure 6:
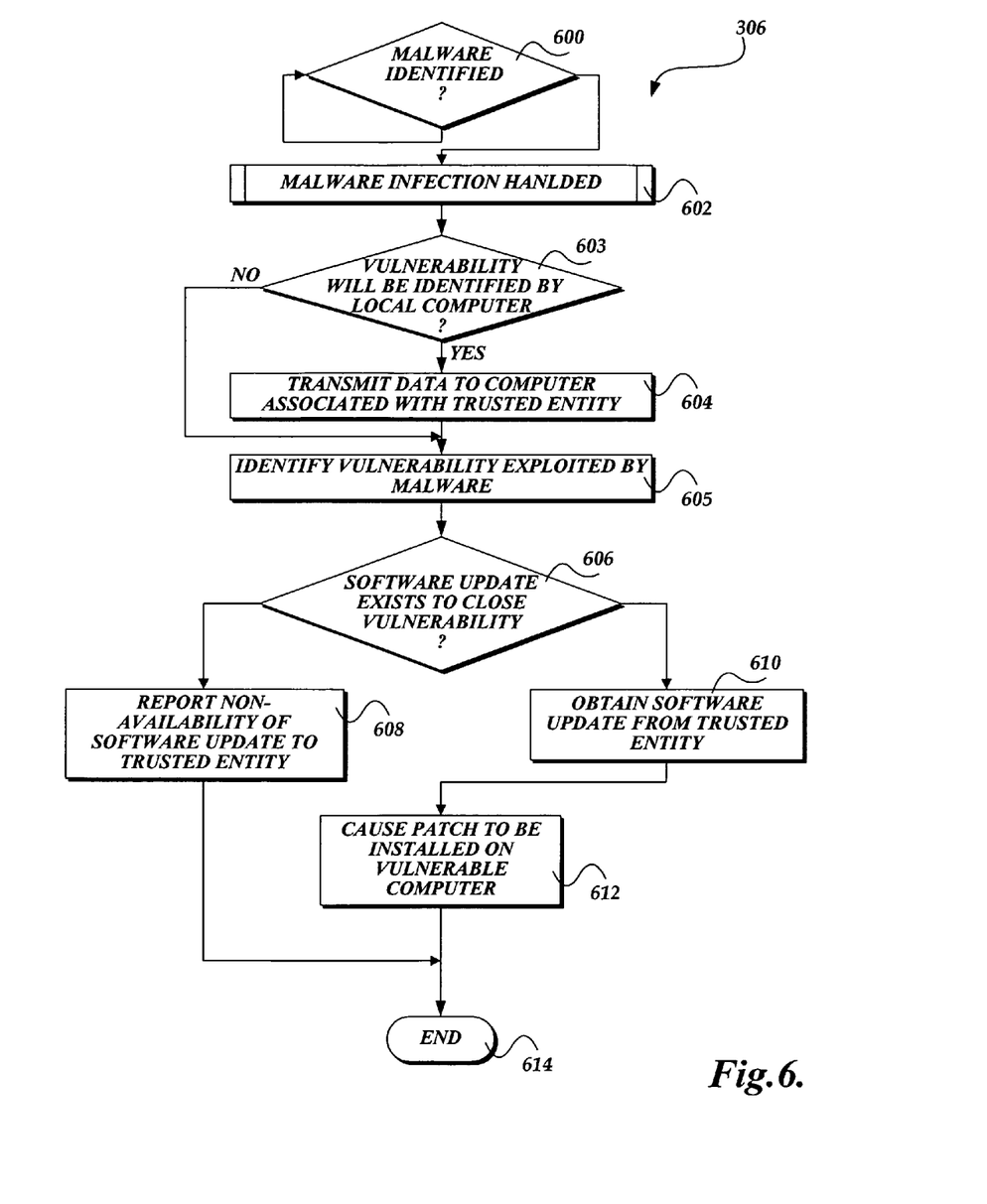
FIG. 6 is a flow diagram illustrating one embodiment of a method that causes a software update to be installed on a computer when a malware is identified, in accordance with the present invention.

As illustrated in FIG. 6, the coordination module 306 begins at block 600 where the module 306 remains idle until antivirus software identifies malware on a computer that implements the present invention. As described previously, many different software vendors provide antivirus software that identifies a malware infection. Moreover, currently available antivirus software may use a variety of malware detection techniques, alone or in combination, to protect a computer from malware. The coordination module 306 may be used in conjunction with any currently existing or yet to be developed antivirus software. Moreover, the antivirus software used by the present invention may employ any one of a number of malware detection techniques. When malware is identified at block 600, the coordination module 306 is notified of the malware, using techniques for communicating between software modules that are generally known in the art. However, those skilled in the art and others will recognize that the coordination module 306 may begin functioning in other contexts without departing from the scope of the present invention. For example, the present invention may be integrated with other types of anti-malware products such as firewalls, anti-spyware software, and the like.

At block 602, the malware infection identified at block 600 is handled by the antivirus software. Those skilled in the art and others will recognize that when a malware infection is detected, the infection may be handled in one of many different ways. Preferably, the infected computer is capable of being "cleaned" so that the malware is no longer resident on the computer. However, in some instances, the malware may be configured to employ self-preservation techniques to resist being cleaned. As a result, removing the malware from the computer may not be feasible in all instances. As a result, the malware may be "quarantined," so that data associated with the malware is incapable of being executed on the computer.

At block 603, the coordination module 306 determines whether the vulnerability exploited by the malware will be identified by a local computer where the malware was identified (e.g., the client computer 204) or a remote computer associated with a trusted entity (e.g., the vulnerability computer 202). As described previously with reference to FIGS. 3-5, aspects of the present invention may be implemented either on a computer associated with a user or a remote computer associated with a trusted entity. For example, aspects of the present invention may be implemented as a Web service that identifies vulnerabilities on behalf of other computers. In any event, if the vulnerability exploited by the malware will be identified by a local computer associated with a user, the coordination module 306 proceeds to block 605 described below. Conversely, if the vulnerability exploited by the malware will be identified by a remote computer associated with a trusted entity, the coordination module 306 proceeds to block 604.

At block 604, data is transmitted from a local computer associated with the user to a remote computer associated with a trusted entity. As mentioned above, in one embodiment of the present invention, a trusted entity provides a Web service that performs functions on behalf of a local computer. In this instance, a Web service request is generated at block 604 and transmitted from a local computer to a computer associated with a trusted entity. The request is designed to provide the Web service with sufficient information so that the Web service may identify a software update that is configured to close the vulnerability that exists on the requesting computer. Thus, the identity of the malware and/or configuration data that describes the software state of the requesting computer may be transmitted to the Web service in the request.

A computer associated with a trusted entity may identify a vulnerability on behalf of a local computer in other contexts than a Web service. For example, at block 604 a dump file may be transmitted to a computer associated with the trusted entity using existing software systems. In this embodiment, a request to a Web service is not generated. Instead, at block 604, a dump file that contains the contents of computer memory is generated and transmitted to a computer associated with the trusted entity. As mentioned previously, logic on a computer associated with the trusted entity performs an analysis of the dump file to identify the malware that is infecting the local computer.

As illustrated in FIG. 6, at block 605, the coordination module 306 identifies the vulnerability exploited by the malware that is infecting the local computer associated with a user. Those skilled in the art and others will recognize that software providers continuously monitor communication networks for new computer malware. When a new computer malware is identified, the developers analyze code that implements the malware to detect vulnerabilities exploited by the malware. Then, a software update or "patch" is created to close the exploited vulnerability. Typically, software updates are distributed through a Web site or an automatic software update system. However, with these distribution mechanisms, users may not obtain software updates that are needed to close vulnerabilities on their computers. For example, a user may not obtain the software updates from a Web site or "opt-in" to an automatic update system designed to distribute the software updates.

As part of the process of creating software "patches," developers also maintain a data store (e.g., the malware database 302) that maps a vulnerability to one or more malware that exploits the vulnerability. For example, the malware database records a vulnerability (e.g., "TYPE 1 BUFFER OVERFLOW") and identifies one or more malware (e.g., "SASSER") that are known to exploit this vulnerability. In one embodiment of the present invention, the vulnerability exploited by the malware is identified, at block 605, by performing a lookup in a data store that is maintained on a local computer associated with a user (e.g., the client computer 204). In this instance, the vulnerability is identified by generating a query to the data store using techniques that are generally known in the art.

In alternative embodiments of the present invention, the vulnerability exploited by the malware is identified at block 605 by a computer associated with a trusted entity. For example, as described previously, aspects of the present invention may be provided as a Web service. In this instance, the local computer associated with the user (e.g., the client computer 204) generates a Web service request that is handled by a computer associated with the trusted entity (e.g., the vulnerability computer 202). In response, a database lookup is performed, that extracts information in a data store. For example, a data store that maps a vulnerability to one or more malware may be maintained on the computer associated with a trusted entity. When data such as a Web service request on a dump file is received from the local computer, the data is analyzed and used to identify the vulnerabilities exploited from a data store.

As illustrated in FIG. 6 at block 606, the coordination module 306 determines whether a software update exists that is configured to close the vulnerability identified at block 605. Those skilled in the art and others will recognize that creating a software update that closes a vulnerability may take a significant amount of time. As a result, the necessary software update may not be available in all instances. If a software update that is designed to close the vulnerability is available, the coordination module 306 proceeds to block 610 described below. Conversely, if a software update that is designed to close the vulnerability is not available, the coordination module 306 proceeds to block 608.

At block 608, the coordination module 306 reports the non-availability of a software update to the trusted entity. By reporting the non-availability of the necessary software update, the coordination module 306 provides data to developers that may be used to identify critical software updates that need to be distributed to users in order to counter a new malware threat. Then the coordination module proceeds to block 614 where it terminates.

As illustrated in FIG. 6, at block 610, the necessary software update or "patch" is transmitted from a computer associated with the trusted entity (e.g., vulnerability computer 202) to a local computer where the malware was discovered (e.g., the client computer 204). As mentioned previously with reference to FIG. 3, aspects of the present invention may use an existing software update client 304 to communicate with a computer associated with the trusted entity and obtain one or more software updates. In accordance with one embodiment of the present invention, the software update client 304 maintains an application programming interface ("API") that is called by the coordination module 306. In response, the software update client 304 satisfies the API call by communicating with the computer associated with the trusted entity using standard network protocols. Then the software update is installed on the local computer at block 612, using a system and method that are generally known in the art. Finally, the coordination module 306 proceeds to block 614 where it terminates. However, those skilled in the art will recognize that other systems may be used to obtain and install the software update without departing from the scope of the present invention. For example, as mentioned previously, the necessary software update may be obtained manually from a Web page or other distribution mechanism without departing from the scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method performed on a local computer that includes antivirus software, the method for closing a vulnerability on the local computer, the method comprising:

in response to the antivirus software detecting a presence of malware on the local computer, determining whether to request a remote computer associated with a trusted entity to identify a vulnerability exploited by the malware detected by the antivirus software on the local computer;

in response to determining that the remote computer is to be requested:

generating a dump file that contains current memory contents of the local computer, including the dump file in a request, transmitting the request to the remote computer associated with the trusted entity that provides a service that identifies vulnerabilities on behalf of other computers, the request comprising malware information identifying the malware detected by the antivirus software on the local computer, causing, in response to the transmitted request, the remote computer to match the memory contents of the local computer as recorded in the dump file to a malware and the vulnerability exploited by the malware, and receiving, from the remote computer associated with the trusted entity, in response to the transmitted request, vulnerability information identifying the vulnerability;

in response to determining that the remote computer is not to be requested, identifying, based on information accessible to the local computer, the vulnerability;

obtaining a software update from the trusted entity, the software update being designed to close the vulnerability; and causing the software update to be installed on the local computer.

2. The method as recited in claim 1, wherein the software update is obtained from the trusted entity using a client-based software update system designed to identify software updates that need to be installed on the local computer after performing an analysis of at least some configuration of the local computer.

3. The method as recited in claim 1, wherein the software update is obtained from the trusted entity through a Web service that links the local computer to the software update.

4. The method as recited in claim 1, wherein the software update is installed automatically without requiring input from the user.

5. The method of claim 1, further comprising querying a database that stores at least one first identifier for the vulnerability in association with at least one second identifier for one or more malware which exploits the vulnerability.

6. At least one computer-readable storage device storing computer-executable instructions that, when executed by a local computer that includes antivirus software, cause the local computer to perform actions for closing a vulnerability on the local computer, the actions comprising:

in response to the antivirus software identifying malware on the local computer, determining whether to request a remote computer to identify a vulnerability exploited by the malware detected by the antivirus software on the local computer;

in response to determining that the remote computer is to be requested:

generating a dump file that contains current memory contents of the local computer, including the dump file in a request, transmitting the request to the remote computer, the request comprising malware information identifying the malware detected by the antivirus software on the local computer, causing, in response to the transmitted request, the remote computer to match the memory contents of the local computer as recorded in the dump file to a malware and the vulnerability exploited by the malware, and receiving, from the remote computer in response to the transmitted request, vulnerability information identifying the vulnerability;

in response to determining that the remote computer is not to be requested, identifying the vulnerability;

obtaining a software update from a trusted entity, the software update being designed to close the vulnerability; and causing the software update to be installed on the local computer.

7. The at least one computer-readable storage device as recited in claim 6, wherein the remote computer provides a Web service and the request transmitted to the remote computer is a Web request.

8. The at least one computer-readable storage device as recited in claim 6, wherein the software update is obtained from the trusted entity using a client-based software update system designed to identify software updates that need to be installed on the local computer after identifying at least some configuration of the local computer.

9. The at least one computer-readable storage device as recited in claim 6, wherein the software update is obtained from the trusted entity through a Web service that links the local computer to the software update using a Web page.

10. The at least one computer-readable storage device as recited in claim 6, wherein the software update is installed automatically without requiring input from the user.

11. The at least one computer-readable storage device of claim 6, wherein the method further comprises querying a database that stores at least one first identifier for the vulnerability in association with at least one second identifier for one or more malware which exploits the vulnerability.

12. A first computer and at least one program module together configured for performing actions for closing a vulnerability on the first computer, the first computer comprising a memory, the actions comprising:

executing antivirus software configured for identifying data on the first computer that is characteristic of malware;

determining whether to request a remote computer to identify a vulnerability exploited by malware detected by the antivirus software on the first computer;

in response to determining that the remote computer is to be requested:

generating a dump file that contains current memory contents of the first computer, including the dump file in a request, transmitting a request to the remote computer, the request comprising malware information identifying the malware detected by the antivirus software on the first computer, causing, in response to the transmitted request, the remote computer to match the memory contents of the first computer as recorded in the dump file to a malware and the vulnerability exploited by the malware, and receiving, from the remote computer in response to the transmitted request, vulnerability information identifying the vulnerability;

in response to determining that the remote computer is not to be requested, identifying the vulnerability on the first computer at least in part by accessing, based at least in part on the malware detected by the antivirus software on the first computer, a local data store that stores at least one first identifier for a vulnerability in association with at least one second identifier for malware that exploits the vulnerability;

determining whether a software update is available from a trusted entity to close the vulnerability;

in response to the determining that the software update is available from the trusted entity, causing the software update to be installed on the first computer; and in response to the determining that the software update is not available from the trusted entity, reporting to the trusted entity that no software updates are available to close the vulnerability.

13. The system as recited in claim 12, the actions further comprising using a software update system to obtain the software update from the trusted entity by issuing an application programming interface call to the software update system.

* * * * *